United States Patent
Kalabic et al.

(10) Patent No.: US 10,922,966 B2
(45) Date of Patent: Feb. 16, 2021

(54) SYSTEM AND METHOD FOR ASYMMETRIC TRAFFIC CONTROL

(71) Applicant: Mitsubishi Electric Research Laboratories, Inc., Cambridge, MA (US)

(72) Inventors: Uros Kalabic, Jamaica Plain, MA (US); Nils Gustav Nilsson, Lund (SE); Piyush Grover, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 149 days.

(21) Appl. No.: 16/176,195

(22) Filed: Oct. 31, 2018

(65) Prior Publication Data

US 2020/0135015 A1 Apr. 30, 2020

(51) Int. Cl.
*G08G 1/01* (2006.01)
*H04W 4/44* (2018.01)
*G08G 1/09* (2006.01)
*H04W 4/024* (2018.01)

(52) U.S. Cl.
CPC ......... *G08G 1/0145* (2013.01); *G08G 1/0116* (2013.01); *G08G 1/0133* (2013.01); *G08G 1/091* (2013.01); *H04W 4/024* (2018.02); *H04W 4/44* (2018.02)

(58) Field of Classification Search
CPC .... G08G 1/0145; G08G 1/091; G08G 1/0133; G08G 1/0116; H04W 4/44; H04W 4/024
See application file for complete search history.

(56) References Cited

U.S. PATENT DOCUMENTS

| | | | |
|---|---|---|---|
| 5,424,747 A * | 6/1995 | Chazelas | G01S 1/14 342/70 |
| 9,261,882 B2 * | 2/2016 | Kim | G05D 1/0055 |
| 2016/0321599 A1 * | 11/2016 | Baughman | G06Q 10/06375 |
| 2019/0347371 A1 * | 11/2019 | Sankar | G06F 30/20 |
| 2019/0355245 A1 * | 11/2019 | Gigengack | G08G 1/0129 |

* cited by examiner

*Primary Examiner* — Russell Frejd
(74) *Attorney, Agent, or Firm* — Gennadiy Vinokur; James McAleenan; Hironori Tsukamoto

(57) ABSTRACT

A traffic control system for controlling a traffic of cooperative and uncooperative vehicles determines delays on each segment of the roads of the network based on the current state of the flow of the traffic and determines flows of the cooperative and uncooperative vehicles that satisfy a Nash equilibrium for the cooperative vehicles having a common objective and the uncooperative vehicles having individual objectives. The system determines, for the cooperative vehicles, costs of segments of the roads that correspond to the Nash equilibrium and determines routes for the cooperative vehicles based on the current locations and target locations of the cooperative vehicles, and the costs of the segments of the roads in the network determined for the cooperative vehicles. The routes are transmitted to corresponding cooperative vehicles.

15 Claims, 10 Drawing Sheets

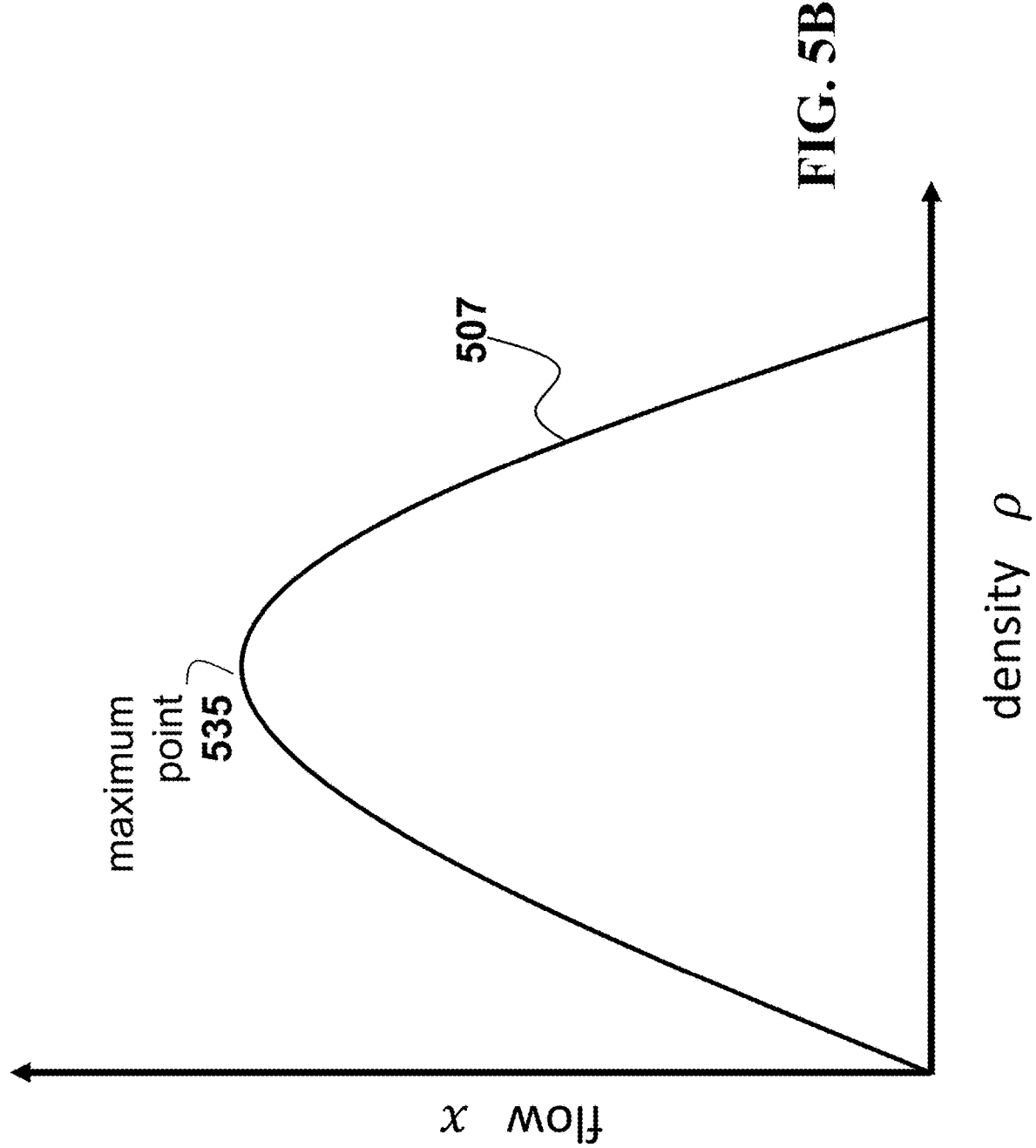

SYSTEM AND METHOD FOR ASYMMETRIC TRAFFIC CONTROL

TECHNICAL FIELD

This invention relates generally to controlling movement of vehicles and more particularly to direct traffic control of cooperating vehicles moving in a network of roads.

BACKGROUND

Traffic congestion is a significant problem in many locales throughout the world, with costs that include lost hours, environmental threats, and wasted fuel consumption. The costs of traffic congestion can be measured in hundreds of dollars per capita per year in the United States. To that end, there is a need to reduce traffic congestion and/or improve any other traffic goal.

Typically, the traffic congestion problem is addressed via traffic information and guidance systems helping to cope with traffic conditions in cities and on densely trafficked highways. For example, it is common to utilize Global Positioning System (GPS) transceivers in navigation terminals installed in cars, to find destinations and being guided by for example apps from Google Map.

Such solutions are usually of great help, but there may be incidents for example which can block or which require changes of a selected route after a navigation terminal for example has calculated an optimal route to follow. Further, if many road users are travelling at the same time, for example to a major sport event, the optimal route found by a navigation tool may no longer be an optimal route. This scenario illustrates an important aspect of road guidance systems since an optimal route in the sense of being objectively the shortest route between two geographical locations may not subjectively be viewed or be experienced as an optimal route by all road users. The time of travel between two points are of course important, but there might also exist road user preferences like a personal perception about what is the best route to follow, or a road user wants to pass a certain point of interest like a viewpoint, or a restaurant etc. Therefore, it is necessary with a more complex measure of an optimal route like a metric that takes into account both objective measurable traffic conditions as well as subjective user preferences having an impact on a specific traffic advice or guidance.

There exist prior art mathematical theories that can model some typical examples of user behavior in traffic and the impact on road conditions. For example, it is common to look at game theory and one important concept is the concept of Nash equilibrium, see, e.g., U.S. Pat. No. 9,928, 743 and CN107181793A. A simple way of explaining the concept of the Nash equilibrium related to traffic is by a simple example of two road users. Road user A and road user B are in Nash equilibrium if road user A is making the best decision for a travel route by taking into account road user B's decision for his travel route, and road user B is making the best decision he can by taking into account road user A's decision. Likewise, a group of road users are in Nash equilibrium if each one is making the best decision about the traffic that he or she can do by taking into account the decisions of the others in the traffic.

However, the game theory may not always be practical in real traffic applications.

SUMMARY

Some embodiments are based on recognition that user behavior in traffic and impact of the user behavior on road conditions can be modeled as a game. In game theory, the concept of Nash equilibrium provides a solution of a non-cooperative game in which each player is assumed to know the equilibrium strategies of the other players, and no player has anything to gain by changing only their own strategy.

Some embodiments are based on recognition that concept of the Nash equilibrium can be used to indirectly control road traffic in order to encourage drivers of the vehicles to optimize a common goal, such as a goal of reducing traffic congestion. Indeed, the Nash equilibrium can be used to indirectly control the vehicles by providing information about beneficial routes and/or creating a system of tolls encouraging the social behavior. Indeed, the tolls tend to reduce congestion on the toll road, and this disincentive to use the toll road is generally positively correlated with the cost of the toll. Hence, tolls can be used as indirect control of the traffic on the roads.

In the present, traffic includes almost exclusively manually-operated vehicles, with a few autonomous vehicles in the mix. In manually-operated vehicles, human operators typically use electronic guidance units to determine a path from one location to another. Those electronic guidance units and/or the toll system can serve as a means of the indirect control. Thus, the indirect control applications provide a uniform or symmetric treatment of the vehicles, i.e., all operators of the vehicles are cooperative, i.e., informed and/or tolled, in a similar manner, even if the operators have different driving objectives.

Some embodiments are based on recognition that current technology advancement enables the traffic situation when the vehicles on the roads can be cooperative directly. As used herein, the direct control means that the cooperative vehicle is requested, possible even forced, to follow a predetermined route. Example of such cooperative vehicles include government vehicles, autonomous vehicles, and ride-share fleets. To that end, it is an object of some embodiments to extend the concept of Nash equilibrium to direct traffic control, i.e., to the applications, in which at least some vehicles can be cooperative directly.

However, in contrast with the uniform indirect control, it is impractical to assume that all vehicles on the roads can be cooperative directly. It is likely, in direct control applications, that some vehicles, such as autonomous vehicles, can be cooperative directly, while other vehicles cannot be cooperative at all. As such, the direct control applications call for asymmetric control of the vehicles, in which some vehicles are directly cooperative and the driving objectives of these vehicles are known, while other vehicles are not cooperative at all and the driving objectives for those vehicles are unknown.

Some embodiments are based on realization that when traffic on roads include cooperative and uncooperative vehicles, a Nash Equilibrium for different traffic objectives of different vehicles with common objective present only for the cooperative vehicles is a partially social Nash equilibrium for partially social traffic objective. However, control with the partially social driving objective can reduce traffic congestion better than control that ignores any social objective at all.

In addition, some embodiments are based on recognition that in some situations, by not following a selfish path, an uncooperative vehicle can achieve its individual driving objective better than by following the selfish path. Specifically, this statement is correct only when enough vehicles cooperate. However, some embodiments are based on realization that when the traffic includes the cooperative vehicles that are guaranteed to pursue the common objective, the selfish path of the uncooperative vehicle is suboptimal for the uncooperative vehicles. To that end, with presence of the cooperative vehicles on the roads pursuing the common objective, the individual objective for each uncooperative vehicles represents the worst-case scenario for achieving the common objective of the cooperative vehicles as well as to achieve the individual objectives of the uncooperative vehicles. In other words, in the case where the common objective is to minimize average time spent in traffic, the deviation of the uncooperative vehicles from their selfish paths does not jeopardize the achievement of the common objective for cooperative vehicles.

To that end, it is realized that if only cooperative vehicles are cooperative according to the partially social Nash equilibrium considering a combination of common and individual objectives, the movement of both the cooperative and uncooperative vehicles can converge to the allocation defined by the partially social Nash equilibrium even if only cooperative vehicles are directly cooperative. Such a realization allows to perform the asymmetric treatment of the vehicles beneficial for direct control applications, even if the driving objectives of some uncooperative vehicles on the roads are unknown and even if the uncooperative vehicles are only indirectly cooperative or not cooperative at all.

Accordingly, one embodiment discloses a traffic control system for controlling a traffic of vehicles in a network of roads. The traffic control system includes an allocation system configured to determine an allocation of cooperative and uncooperative vehicles in a network of roads achieving a Nash equilibrium. The allocation includes a first allocation for the cooperative vehicles having at least one common objective and a second allocation for the uncooperative vehicles each having an individual objective. The allocation system determines the allocation using a flow rate of the vehicles into and out of the network and delays on the roads of the network. For example, the allocation can be determined as a distribution of the vehicles in the network of roads.

The traffic control system also includes a routing system to determine a path for each of the cooperative vehicle in the network based on the first allocation, and a controller to control the movement of each of the cooperative vehicle according to the path determined for the vehicle, while ignoring the movement of the uncooperative vehicles. In such a manner, the traffic control system achieves the direct control of the cooperative vehicles.

For example, the routing system can be implemented in a centralized manner to provide a path of a vehicle through the network of roads to a target destination of the vehicle. Additionally, or alternatively, the routing system can be implemented in a decentralized manner to provide a path of a vehicle through each individual segment of the road. In such a manner, the target destination of the vehicle may remain unknown for individual components of the routing system. As used herein, a path of a vehicle is a sequence of locations of the vehicle.

In some embodiments, the controller can include a communication system interfacing the communication system of the vehicle to upload the determined path to a navigator of the vehicle. Additionally, or alternatively, the controller can determine a motion trajectory of the vehicle based on the path determined by the routing system and control the vehicle according to the motion trajectory. As used herein, a trajectory of a vehicle is a sequence of locations of the vehicle associated with time. For example, the controller can cause the actuators of the vehicle to move the vehicle to track the motion trajectory.

Additionally, some embodiments are based on recognition that Nash equilibrium came from a game theory for a reason. Indeed, in theory, the Nash equilibrium can be calculated based on delay functions indicative of delays on different roads, but in practice, the traffic is too volatile to be predictable. This might be not a problem for indirect control applications when the final responsibility of the driving lies on the operators of the vehicles, but maybe suboptimal for direct control applications. To that end, some embodiments are based on recognition that there is a need a feedback mechanism to tune the routing of the cooperative vehicles. Natural extension of such a traffic system is to adjust the routing if needed, e.g., redirect some vehicles or extend green light for other vehicle. However, such a tuning provides only local optimality.

Some embodiments are based on realization that for aiming to global optimality of traffic control, the allocation or Nash equilibrium calculation needs to be updated in response to a change in the current traffic conditions. To that end, some embodiments determine allocation of vehicles achieving Nash equilibrium based on delays indicative of the current traffic on the roads, monitor traffic state and update the allocation if necessary. In different embodiments, the delay on the road is defined by a linear or a nonlinear function.

For example, in one implementation, the traffic control system includes a traffic monitoring system to monitor a state of a traffic in the network and to update a delay on at least one road in the network based on a change in the state of the traffic. In this implementation, the allocation system updates the allocation in response to the update of the delay, the routing system updates at least some paths of the cooperative vehicle in response to the update of the allocation, and the controller controls at least some vehicles according to the updated paths.

Accordingly, one embodiment discloses a traffic control system for controlling a traffic of cooperative and uncooperative vehicles in a network of roads. The traffic control system includes a receiver configured to receive information indicative of a current state of a flow of the traffic in the network of roads, an inflow rate of the traffic into the network of roads, an outflow rate of the traffic out of the network of roads, and current locations and target locations of the cooperative vehicles; a processor coupled with stored instructions implementing components of the traffic control system, including: a traffic observer configured to determine delays on each segment of the roads of the network based on the current state of the flow of the traffic; a traffic allocator configured to determine flows of the cooperative and uncooperative vehicles that satisfy a Nash equilibrium using the inflow rate of the traffic, the outflow rate of the traffic, and the delays on the roads, the cooperative vehicles having a common objective and the uncooperative vehicles having individual objectives, and determine, for the cooperative vehicles, costs of segments of the roads that correspond to the Nash equilibrium; a traffic router configured to determine routes for the cooperative vehicles based on the current locations and target locations of the cooperative vehicles, and the costs of the segments of the roads in the network determined for the cooperative vehicles; and a transmitter configured to transmit the routes to corresponding cooperative vehicles.

Another embodiment discloses a traffic control method for controlling a traffic of cooperative and uncooperative vehicles in a network of roads, wherein the method uses a processor coupled with stored instructions implementing the method, wherein the instructions, when executed by the processor carry out steps of the method, including receiving information indicative of a current state of a flow of the traffic in the network of roads, an inflow rate of the traffic into the network of roads, an outflow rate of the traffic out of the network of roads, and current locations and target locations of the cooperative vehicles; determining delays on each segment of the roads of the network based on the current state of the flow of the traffic; determining flows of the cooperative and uncooperative vehicles that satisfy a Nash equilibrium using the inflow rate of the traffic, the outflow rate of the traffic, and the delays on the roads, the cooperative vehicles having a common objective and the uncooperative vehicles having individual objectives; determining, for the cooperative vehicles, costs of segments of the roads that correspond to the Nash equilibrium; determining routes for the cooperative vehicles based on the current locations and target locations of the cooperative vehicles, and the costs of the segments of the roads in the network determined for the cooperative vehicles; and transmitting the routes to corresponding cooperative vehicles.

Yet another embodiment discloses a non-transitory computer readable storage medium embodied thereon a program executable by a processor for performing a method, the method including receiving information indicative of a current state of a flow of the traffic in the network of roads, an inflow rate of the traffic into the network of roads, an outflow rate of the traffic out of the network of roads, and current locations and target locations of the cooperative vehicles; determining delays on each segment of the roads of the network based on the current state of the flow of the traffic; determining flows of the cooperative and uncooperative vehicles that satisfy a Nash equilibrium using the inflow rate of the traffic, the outflow rate of the traffic, and the delays on the roads, the cooperative vehicles having a common objective and the uncooperative vehicles having individual objectives; determining, for the cooperative vehicles, costs of segments of the roads that correspond to the Nash equilibrium; determining routes for the cooperative vehicles based on the current locations and target locations of the cooperative vehicles, and the costs of the segments of the roads in the network determined for the cooperative vehicles; and transmitting the routes to corresponding cooperative vehicles.

BRIEF DESCRIPTION

FIG. 5B shows a plot of an example of the fundamental diagram used by some embodiments.

DETAILED DESCRIPTION

It is an object of some embodiments to disclose traffic control system for controlling traffic of vehicles including one or combination of autonomous, semi-autonomous, and manually-operated vehicles. Some of those vehicles choose to select a common objective of the motion. Other vehicles choose to pursue their individual objectives. Examples of the common objectives include reducing a total time the vehicles travel to their destinations and reducing a total amount of energy spend by vehicles. In other words, the cooperative vehicles aim to increase a common good. Example of such cooperative vehicles may include government vehicles, autonomous vehicles, and ride-share fleets. In contrast, the individual objective is selfish. Examples of the individual objectives include reducing an individual time that a specific vehicle travels to its destination and reducing energy of the individual vehicle.

Some embodiments are based on the recognition that user behavior in traffic and impact of user behavior on road conditions can be modeled as a game. In game theory, the concept of Nash equilibrium provides a solution of a non-cooperative game in which each player is assumed to know the equilibrium strategies of the other players, and no player has anything to gain by changing only their own strategy.

Some embodiments are based on recognition that concept of the Nash equilibrium can be used to indirectly control road traffic in order to encourage drivers of the vehicles to optimize a common goal, such as a goal of reducing traffic congestion. However, it is an object of some embodiments to extend the concept of Nash equilibrium to direct control of the vehicles. As used herein, the direct control means that the cooperative vehicle is requested to follow a predetermined route.

However, in contrast with the uniform indirect control, it is impractical to assume that all vehicles on the roads can be cooperative directly. It is likely, in direct control applications, that some vehicles, such as autonomous vehicles, can be cooperative directly, while other vehicles cannot be cooperative at all. As such, the direct control applications call for asymmetric control of the vehicles, in which some vehicles are directly cooperative and the driving objectives of these vehicles are known, while other vehicles are not cooperative at all and the driving objectives for those vehicles are unknown.

Figure 1A:
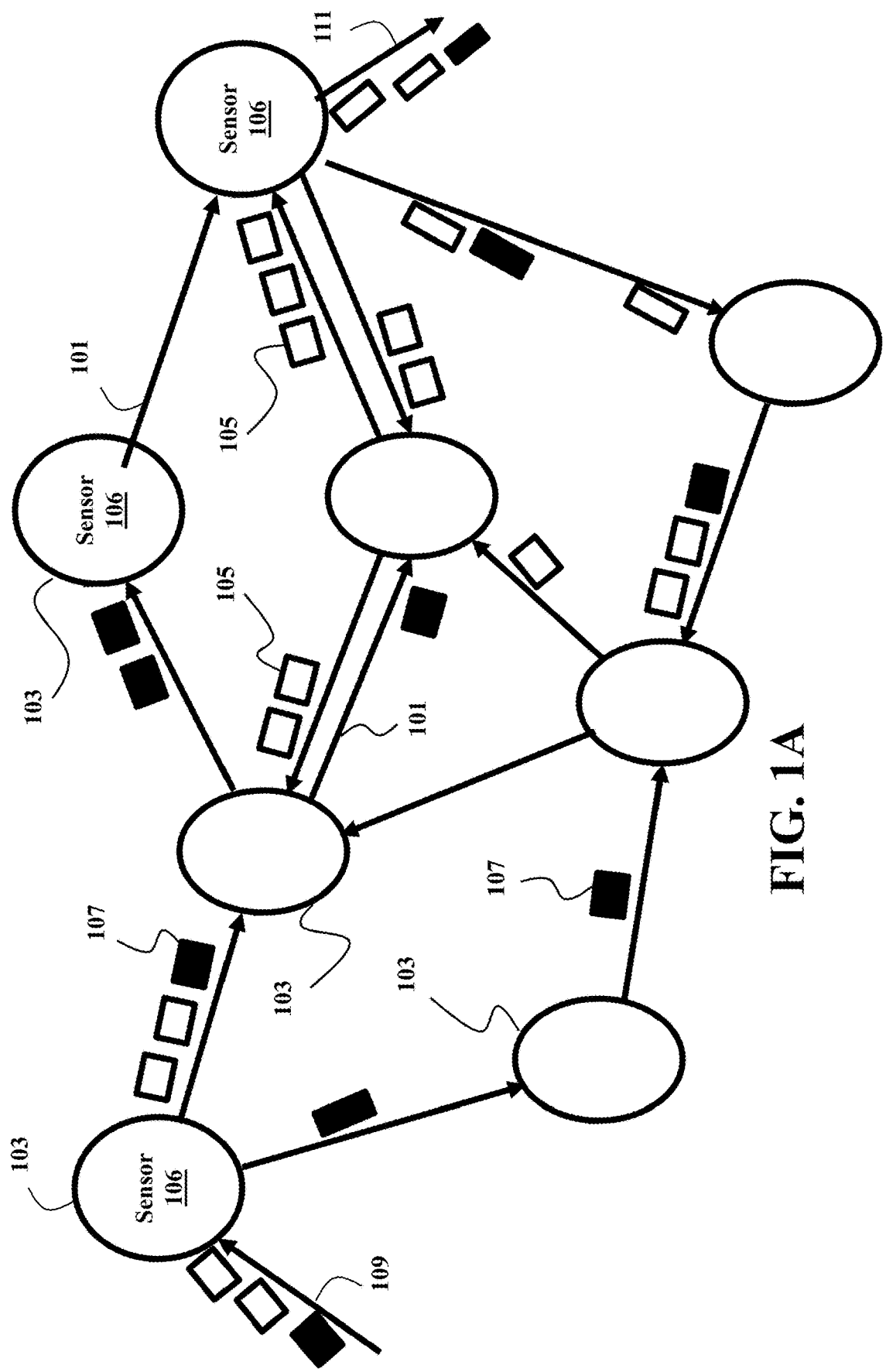
FIG. 1A shows an exemplar of a traffic of cooperative and uncooperative vehicles in a network of roads according to some embodiments.

FIG. 1A shows an exemplar of a traffic of cooperative and uncooperative vehicles in a network of roads according to some embodiments. The network of roads is formed by road segments 101 connected by road junctions 103. Examples of junctions include meeting of two or more roads, intersections, merging lanes. A road segment is a section of a road between two junctions. The traffic on each segment can be one or bi-directional.

In various embodiments, two types of vehicles drive on the road: cooperative vehicles 107, shown as black rectangles, and uncooperative vehicles 105, shown as white rectangles. The locations and/or motions of the cooperative and uncooperative vehicles form a traffic in the network. For convenience, some embodiments observe and/or model the traffic as a flow of the vehicles, which is an equivalent to a distribution of the vehicles. Although many discrete vehicles form vehicle traffic, it is possible to model traffic as a flow, e.g., using Lagrangian estimation. In some implementations, the flow of the vehicles is used to model traffic on a macroscopic level and the methods described herein improve the traffic behavior based on knowledge of traffic flows.

In some embodiments, the network of roads is modeled as an enclosed system having at least one incoming road 109 and at least one outgoing road 111. Similarly, with a current state of flow of the traffic within the network, the incoming road has a corresponding inflow rate of the traffic, and the outgoing road has a corresponding outflow rate of the traffic. In some embodiments, the flows of the traffic in, out and within the network are determining using measurements of sensors 106 configured to sense vehicles passing junctions 103 of the segments of the roads. Additionally, or alternatively, the traffic data can be sensed by sensors installed at the vehicles moving in the network.

Figure 1B:
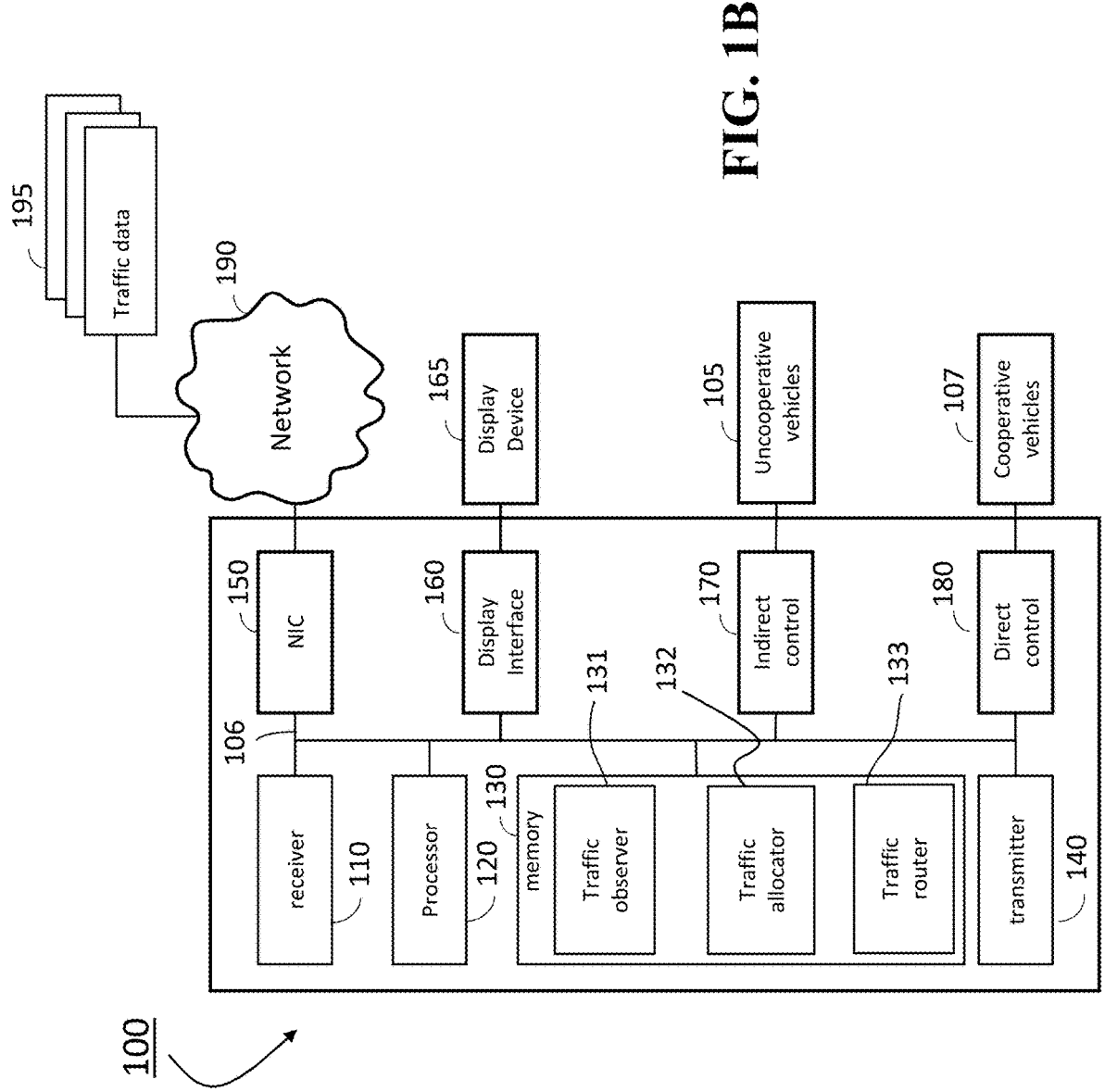
FIG. 1B shows a block diagram of a traffic control system for controlling a traffic of cooperative and uncooperative vehicles in a network of roads in accordance with some embodiments.

FIG. 1B shows a block diagram of a traffic control system 100 for controlling a traffic of cooperative and uncooperative vehicles in a network of roads in accordance with some embodiments. The traffic control system 100 includes a processor 120 configured to execute stored instructions, as well as a memory 130 that stores instructions that are executable by the processor. The processor 120 can be a single core processor, a multi-core processor, a computing cluster, or any number of other configurations. The processor 120 can include multiple processors operatively connected to achieve common objectives. The memory 130 can include random access memory (RAM), read only memory (ROM), flash memory, or any other suitable memory systems. The processor 120 is connected through a bus 106 to one or more input and output devices. These instructions implement a method for controlling the traffic.

In various embodiments, traffic control system 100 includes a receiver 110 configured to receive traffic data 195 indicative of current traffic in the network of roads. The traffic data can include information of a current state of a flow of the traffic in the network of roads, an inflow rate of the traffic into the network of roads, an outflow rate of the traffic out of the network of roads. The current traffic can also include information about current locations and target locations of the cooperative vehicles. The target locations of the uncooperative vehicles are usually unknown.

For example, a network interface controller 150 is adapted to connect the traffic control system 100 through the bus 106 to a network 190. Through the network 190, the traffic data can be received and downloaded for further processing. For example, the receiver, through the network interface controller 150, can receive measurements from the sensor 106 shown in FIG. 1A, and/or can receive current and target locations from navigators of the cooperative vehicles 107. In some implementations, the processor 120 is configured to determine traffic data, such as a current state of a flow of the traffic in the network of roads, an inflow rate of the traffic into the network of roads, an outflow rate of the traffic out of the network of roads, from the measurements and location information. In alternative embodiments, the traffic data 195 is determined by a third party and received by the receiver 110 from the network 190.

The processor 120 coupled with stored instructions implementing components of the traffic control system. The components of the traffic control system includes a traffic observer 131 configured to determine delays on each segment of the roads of the network based on the current state of the flow of the traffic, a traffic allocator 132 configured determine flows of the cooperative and uncooperative vehicles having different objectives that satisfy a Nash equilibrium and produce, for the cooperative vehicles, costs of segments of the roads that correspond to the Nash equilibrium, and a traffic router 133 configured to determine routes for the cooperative vehicles based on the costs of the segments of the roads determined by the traffic allocator 132.

The traffic control system 100 also includes a transmitter 140 configured to transmit the routes to corresponding cooperative vehicles 107 to perform direct control 180 of the cooperative vehicles 107. For example, in some embodiments each cooperative vehicle has an assigned identification number (ID). The transmitter broadcasts or unicasts the route determined for a specific vehicle using a message including the ID of that specific vehicle. The transmitter 140 can also optionally perform an indirect control 170 of the uncooperative vehicles 105, e.g., by requesting to change the traffic lights and adjusting the toll system. Also, the traffic control system 100 can be linked through the bus 106 to a display interface 160 adapted to connect the traffic control system 100 to a display device 165, wherein the display device 165 can include a computer monitor, camera, television, projector, or mobile device, among others.

Some embodiments are based on realization that when traffic on roads includes cooperative and uncooperative vehicles, a Nash Equilibrium for different traffic objectives of different vehicles with common objective present only for the cooperative vehicles is a partially social Nash equilibrium for partially social traffic objective. However, control with the partially social driving objective can reduce traffic congestion better than control that ignores any social objective at all.

In addition, some embodiments are based on recognition that in some situations, by not following a selfish path, an uncooperative vehicle can achieve its individual driving objective better than by following the selfish path. Specifically, this statement is correct only when enough vehicles cooperate. However, some embodiments are based on realization that when the traffic includes the cooperative vehicles that are guaranteed to pursue the common objective, the selfish path of the uncooperative vehicle is suboptimal for the uncooperative vehicles. To that end, with presence of the cooperative vehicles on the roads pursuing the common objective, the individual objective for each uncooperative vehicles represents the worst-case scenario for achieving the common objective of the cooperative vehicles as well as to achieve the individual objectives of the uncooperative vehicles. In other words, in the case where the common objective is to minimize average time spent in traffic, the deviation of the uncooperative vehicles from their selfish paths does not jeopardize the achievement of the common objective for cooperative vehicles.

To that end, it is realized that if only cooperative vehicles are cooperative according to the partially social Nash equilibrium considering a combination of common and individual objectives, the movement of both the cooperative and uncooperative vehicles can converge to the allocation defined by the partially social Nash equilibrium even if only cooperative vehicles are directly cooperative. Such a realization allows to perform the asymmetric treatment of the vehicles beneficial for direct control applications, even if the driving objectives of some uncooperative vehicles on the roads are unknown and even if the uncooperative vehicles are only indirectly cooperative or not cooperative at all.

Figure 2:
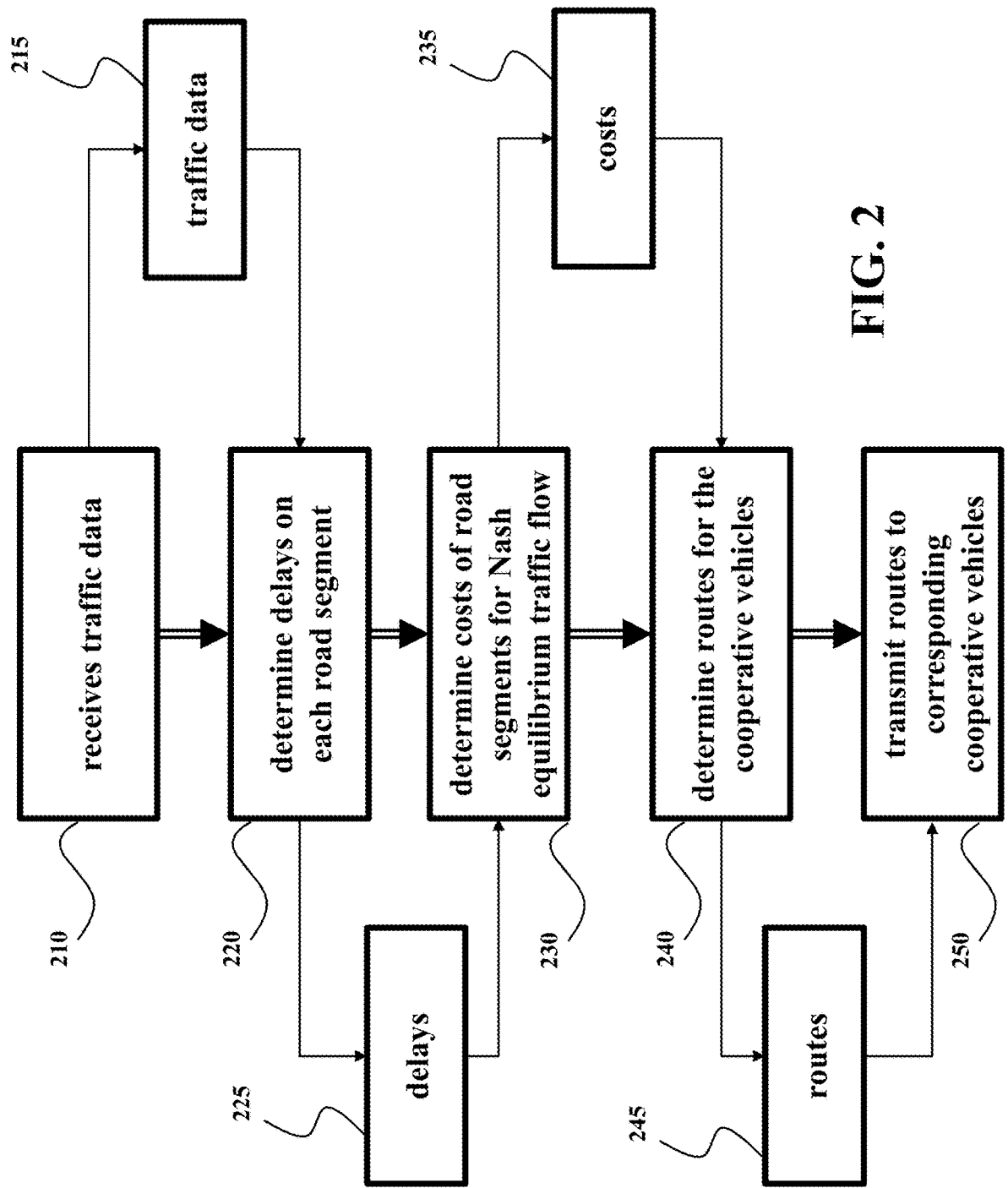
FIG. 2 shows a block diagram of a method for controlling traffic of cooperative and uncooperative vehicles in a network of roads performed by the traffic control system according to some embodiments.

FIG. 2 shows a block diagram of a method for controlling traffic of cooperative and uncooperative vehicles in a network of roads performed by the traffic control system 100 according to some embodiments. The method receives 210, using the receiver 110, traffic data 215 indicative of a current state of a flow of the traffic in the network of roads, an inflow rate of the traffic into the network of roads, an outflow rate of the traffic out of the network of roads, and current locations and target locations of the cooperative vehicles.

The method determines 220, using the traffic observer 131, delays 225 on each segment of the roads of the network based on the current state of the flow of the traffic. In some implementations, the delays 225 are defined as a function, sometimes as a nonlinear function to consider complexity of the traffic. The method determines 230, using the traffic allocator 132, flows vehicles that satisfy a Nash equilibrium for both the cooperative vehicles having a common objective and the uncooperative vehicles having an individual objective. The flows that satisfies the Nash equilibrium are determined using the inflow rate of the traffic, the outflow rate of the traffic, and the delays on the roads.

The method also determines 230, using the traffic allocator 132, the costs 235 of segments of the roads that correspond to the Nash equilibrium. As used herein, cost is a penalty associated with traversing one road segment. Notably, the costs 235 are the costs determined for the cooperative vehicles, which is different from the costs of uncooperative vehicles due to difference in the common and individual objectives. The cost for the uncooperative vehicles may or may not be determined.

Some embodiments are based on realization that the costs of the segments of the roads determined for the cooperative vehicles in a multi-objective Nash equilibrium optimization decouples the control of the cooperative and uncooperative vehicles. Even though cooperative vehicles are routed to minimize the cost associated with them, the uncooperative vehicles continue to be routed according to the other cost. Because of this, if the cooperative vehicles are controlled to minimize the cooperative cost computed by the allocation, the uncooperative vehicles will also minimize uncooperative cost computed by allocation, but without control. Such a decoupling allows controlling directly only cooperative vehicles based on flows determined for both cooperative and uncooperative vehicles with different objectives. After the costs 235 of the cooperative vehicles are determined, the method determines 240, using the traffic router 133, the routes 245 for the cooperative vehicles based on the current locations and target locations of the cooperative vehicles, and the costs 235 of the segments of the roads in the network determined for cooperative vehicles, while ignoring the costs of the segments for the uncooperative vehicles. Such a routing allows controlling the cooperative vehicles in consideration of the motion of uncooperative vehicles.

After the routes 245 are determined, the method transmits 250 to the cooperative vehicles, using the transmitter 133, their corresponding routes. For example, the traffic control system maintains an identification (ID) of each cooperative vehicle and transmits the route determined for a vehicle together with its corresponding ID.

Traffic Allocation

Figure 3A:
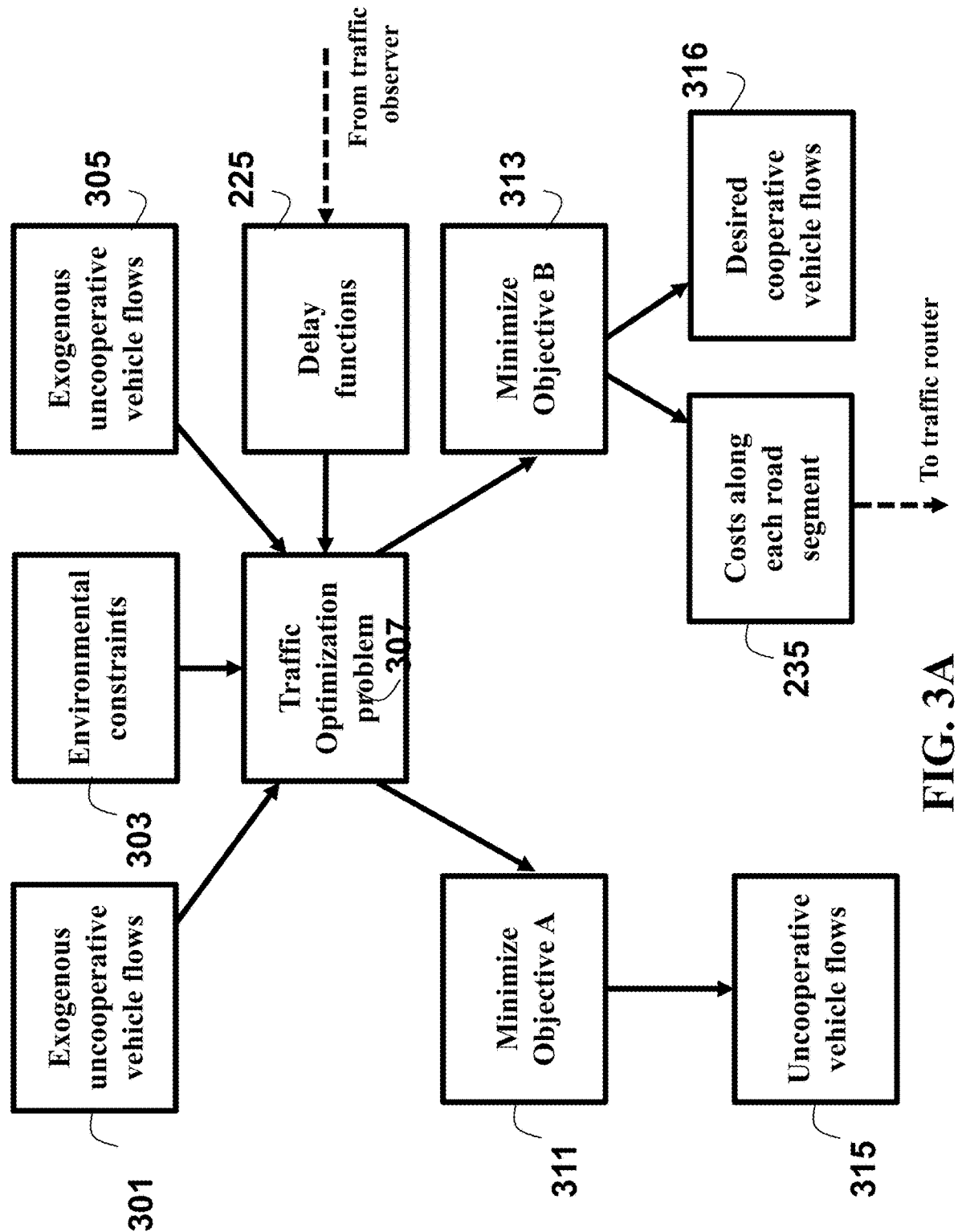
FIG. 3A shows a schematic of multi-objective Nash equilibrium optimization performed by a traffic allocator according to some embodiments.

FIG. 3A shows a schematic of multi-objective Nash equilibrium optimization performed by a traffic allocator according to some embodiments. The embodiments determine the desired distribution and/or flow of vehicles by solving a dual objective optimization problem. The dual objective is solved for a two objectives scenario when the cooperative vehicles have a common objective and the uncooperative vehicles have individual objectives. In some situations, however, the cooperative vehicles belong to different groups having different common objectives. For those situations, the traffic allocator finds the Nash equilibrium using different common objectives of the cooperative vehicles of different groups.

For example, the uncooperative vehicles are modeled as agents minimizing "Objective A" 311 subject to constraints of the environment 303. Cooperative vehicles are modeled as agents minimizing "Objective B" 313 subject to constraints of the environment 303. Examples of the constraints 303 includes map of the road in the network, traffic constraints, such as speed limits, stop signs, etc. Additionally, or alternatively, the environmental constraints correspond to physical requirements that flows within the network stay positive and that the sum of flows into a road junction equals the sum of flows out of the same junction.

Some embodiments solved traffic optimization problem 307 having at least two objectives. The solution uses the same optimization data, including exogenous inflows 301, i.e., an inflow rate of the traffic into the network of roads, and exogenous outflows 305, i.e., outflow rate of the traffic out of the network of roads, the environmental constraints 303, and delay function 225. The traffic allocator determines the desired flow of cooperative vehicles 316 and cost of following each road segment 235 by minimizing Objective B, keeping the flow 315 of uncooperative vehicles unchanged. The uncooperative vehicles are modeled as minimizing Objective A, keeping the flow of cooperative vehicles unchanged. The solution to this problem, in which there is no way that the cooperative vehicles can minimize Objective B without help from the uncooperative vehicles and, simultaneously, the uncooperative vehicles can minimize Objective A without help from the cooperative vehicles, is called a Nash equilibrium.

The cooperative vehicles' objective corresponds to the maximization of a common good and the uncooperative vehicle objective corresponds to the maximization of a selfish goal. Dual-objective problems can be solved using various methods which depend on the problem structure. For example, one embodiment uses the best-response method where the optimization is solved at each iteration, alternating between objectives. Another embodiment solves a related problem which minimizes the linear combination of the two objectives. This latter method works for convex objective functions, and the following objective functions are convex under certain realistic conditions. Sometimes an analytic solution exists, but most often the problem has to be solved numerically. In the case of minimizing average vehicle time spend in traffic by all cooperative vehicles, the cooperative vehicle objective function takes the form $$\text{Objective } B = \sum_{i=1}^{n} x_i^B d_i(x_i^A + x_i^B)$$

The function is the sum of times taken to traverse each road segment by cooperative vehicles over all segments in the traffic network. The subscript i denotes the particular road segment. The flow of cooperative vehicles on road segment i is labeled $x_i^B$ and the flow of uncooperative vehicles on road segment i is labeled $x_i^A$. The function $d_i$ is known as a delay function; it measures the amount of time taken to traverse the road segment i and depends on the flow of vehicles currently on the road segment.

Another, related objective corresponds to the case of minimizing average vehicle time spend in traffic by all vehicles, cooperative and uncooperative. In this case, the cooperative vehicle objective function takes the form $$\text{Objective } B = \sum_{i=1}^{n}(x_i^A + x_i^B)d_i(x_i^A + x_i^B)$$

The objective function of the uncooperative vehicles is different from that of the cooperative vehicles. One embodiment is based on recognition that most drivers typically wish to minimize their individual travel time and, when taken as a collective behavior, this differs from minimizing the travel time of the average vehicle. In this case, the objective function takes the form $$\text{Objective } A = \sum_{i=1}^{n} \int_{0}^{x_i^A} d_i(s + x_i^B) ds$$

wherein s is an integration variable that disappears after integration.

There are multiple solutions to the dual-objective problem. The particular solution that is required by the design is called the Nash equilibrium. A Nash equilibrium corresponds to a solution where neither objective can be improved solely by individual agents; it is called an equilibrium because it remains in the interest of participants to not change their respective equilibrium strategies thereby penalizing themselves. Mathematically, the traffic optimization problem 307 solved by some embodiments can be written as the simultaneous solution to the optimization problems $$\min_{x_i^A} \text{Objective } A$$

$$\min_{x_i^A} \text{Objective } B$$

Figure 3B:
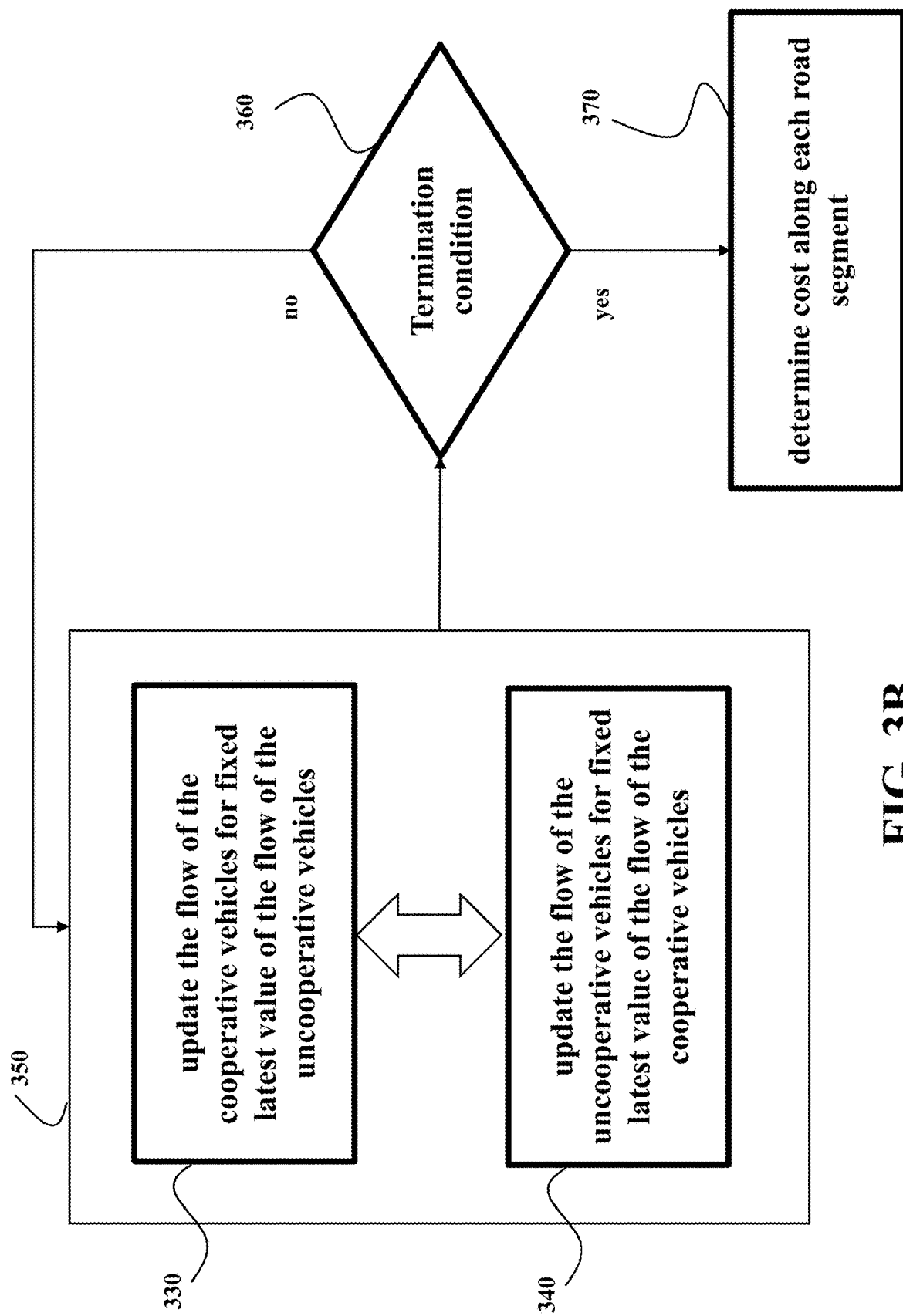
FIG. 3B shows a schematic of a method for solving traffic optimization problem according to one embodiment.

FIG. 3B shows a schematic of a method for solving traffic optimization problem according to one embodiment. In this embodiment, the traffic allocator determines the flows of the cooperative and uncooperative vehicles that satisfy the Nash equilibrium iteratively until a termination condition 360 indicating the Nash equilibrium is reached. For a current iteration 350 the traffic allocator is configured to update 330 the flow of the cooperative vehicles for fixed latest value of the flow of the uncooperative vehicles and update 340 the flow of the uncooperative vehicles for fixed latest value of the flow of the cooperative vehicles. The traffic allocator, in response to reaching the termination condition 360, is configured to determine 370 the cost 235. The optimal cost along each road segment i is given by $$g_i = g_i(x_i^A, x_i^B) = x_i^B d'_i(x_i^A + x_i^B) + d_i(x_i^A + x_i^B)$$

where $d'_i$ is the derivative of $d_i$. This cost is derived by differentiating the term under the summand of Objective B $$x_i^B d_i(x_i^A + x_i^B)$$

by $x_i^B$. It is known that if all cooperative vehicles compute their routes by minimizing the sum of the costs $g_i$ along their chosen route, then they will collectively minimize Objective B.

Therefore, the traffic allocator passes along the costs $g_i$ to the traffic router. It does this by solving for the Nash equilibrium flows $x_i^A$ and $x_i^B$, and evaluating $g_i = g_i(x_i^A, x_i^B)$ according to these values.

Traffic Routing

Figure 4:
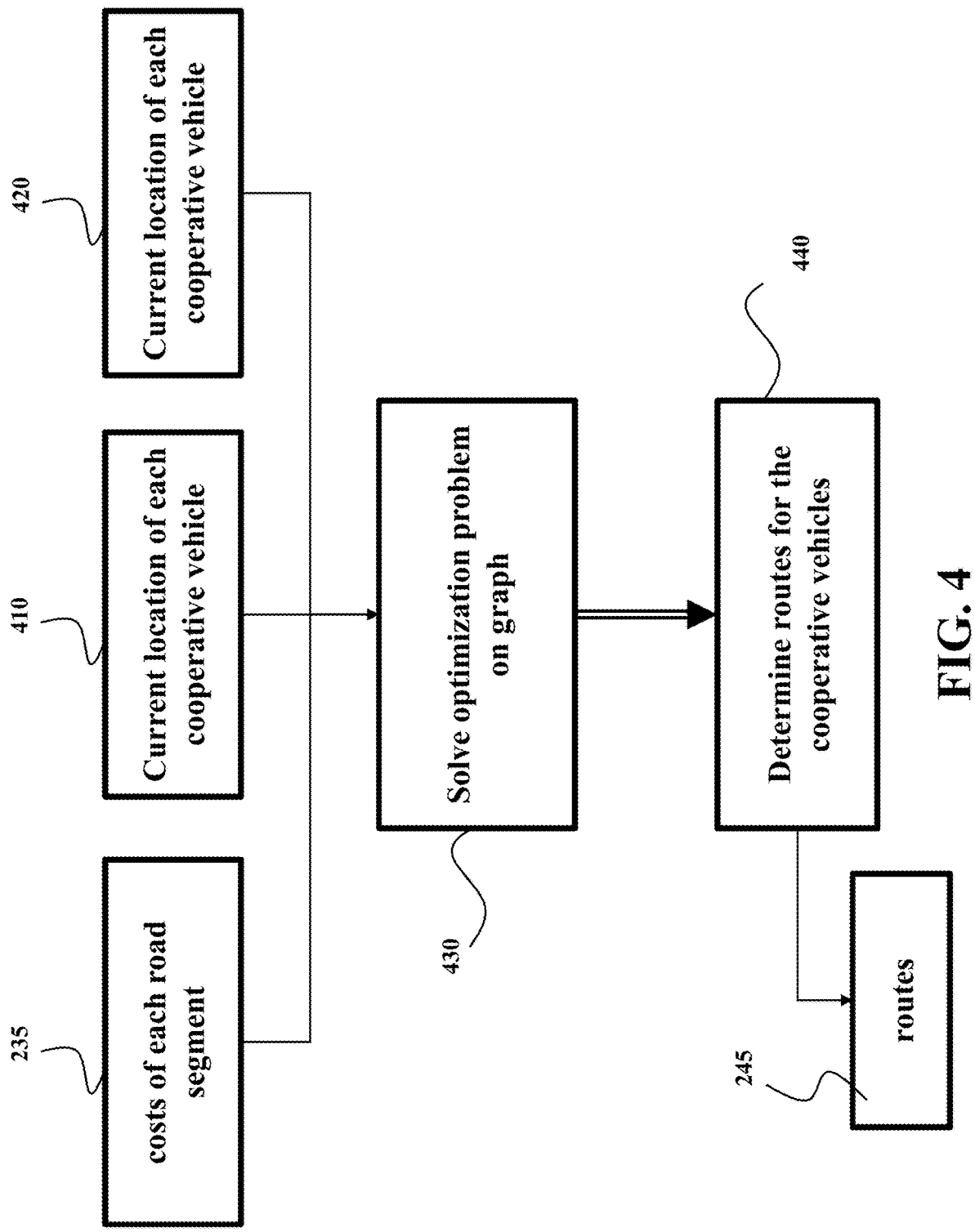
FIG. 4 shows a block diagram of a method for determining routes for cooperative vehicles according to some embodiments.

FIG. 4 shows a block diagram of a method for determining routes for cooperative vehicles according to some embodiments. The routes are determined based on the current 410 and target 420 locations of the vehicles, as well as based on the cost 235 of each of road segment determined for the cooperative vehicles. As described above, the cost 235 for the cooperative vehicles differs from the cost that would be determined for the uncooperative vehicles. However, the cost 235 is determined in consideration of the uncooperative vehicles. As such, the traffic router considers uncooperative vehicles indirectly.

For each individual, cooperative vehicle, its route 440 is determined by solving the optimization problem 430 corresponding to the minimum cost path in the traffic network, which can be modeled as a graph, given the costs 235, on the network connecting the vehicle's current location 410 and its target location 420. To do this, some implementations solve an optimization problem that finds a route $p = \{i_1, i_2, \ldots, i_m\}$, which is an ordered sequence of road segments to be traversed by the vehicle in question that connects the current location to the target location. The cost along the route is given by $$g_{i_1} + g_{i_2} + \ldots + g_{i_m}$$

and it is the lowest possible cost for any path connecting the current vehicle location to its target location. Various methods can be used to solve this problem. For example, some embodiments use different variations of the Dijkstra's algorithm for finding the shortest paths between nodes in a graph, which may represent, for example, road networks. The algorithm exists in many variants. Dijkstra's original variant found the shortest path between two nodes, but a more common variant fixes a single node as the "source" node and finds shortest paths from the source to all other nodes in the graph, producing a shortest-path tree. The skilled artisan would readily recognize other variations of Dijkstra's algorithm.

Traffic Observer

Some embodiments are based on realization that for aiming to global optimality of traffic control, the allocation or Nash equilibrium calculation needs to be updated in response to a change in the current traffic conditions. To that end, some embodiments determine allocation of vehicles achieving Nash equilibrium based on delays indicative of the current traffic on the roads, monitor traffic state and update the allocation if necessary. In different embodiments, the delay on the road is defined by a linear or a nonlinear function.

For example, in one implementation, the traffic observer monitors a current state of traffic in the network and to update a delay on at least one road in the network based on a change in the state of the traffic. In this implementation, the traffic allocator updates the costs of the road segments in response to the update of the delay, the traffic router updates at least some routes for the cooperative vehicle in response to the update of the costs, and the transmitter transmits the updated routes to the corresponding vehicles.

Figure 5A:
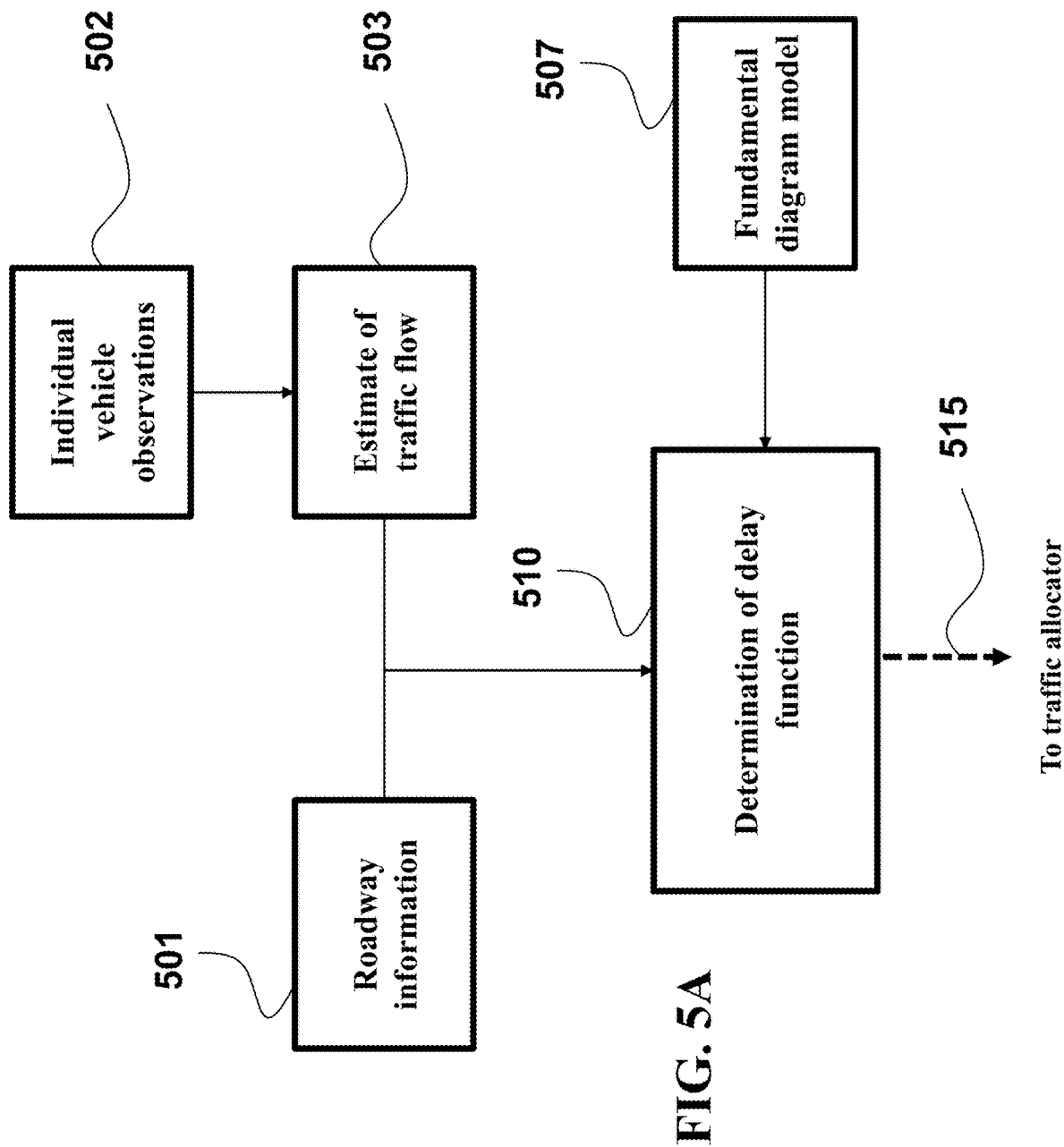
FIG. 5A shows a schematic of a method for determining delays on the road of network according to some embodiments.

FIG. 5A shows a schematic of a method for determining delays on the road of network according to some embodiments. The embodiments determine 510 the delay functions length 501 of the road segments, number 503 of vehicles on each road segment, and average velocity 505 of the vehicles. In some implementations, the traffic observer uses dynamic equations describing traffic to determine $510n$ the delays 515. For example, the dynamic can be modeled using the Lighthill-Whitham-Richard (LWR) model. The equations on each road segment are given by $$\partial_t \rho_i + \partial_x (\rho_i v_i) = 0.$$

The density of vehicles on a road segment i is denoted by $\rho_i$ and the average velocity of vehicles along that road segment is denoted by $v_i$. The flow is given by the relationship $x_i = \rho_i v_i$.

Vehicle traffic is formed by individual vehicles but, due to the large number of vehicles in a traffic system, it is desirable to model traffic as a flow. A simple flow model is to divide the number of vehicles passing by a prescribed location on the road by the time span in which observations were taken. A more involved and precise method is to use a nonlinear estimator such as an extended Kalman filter or Lagrangian data-assimilation (Xia et al., 2017) that fits its observations to the dynamics of the LWR model. In these types of estimation methods, a model for traffic flow is used to propagate an estimate of the traffic flow in time, given some initial guess of the current traffic; then, actual vehicle observations are used to modify these flow estimates, giving weight to both the propagated estimate and the actual observation.

There is a fundamental relationship between flows and delays and the flows are needed to determine the delay corresponding to each road segment. FIG. 5A provides an overview of the determination of the delay. In the figure, individual vehicle observations 502 are used to estimate traffic flows. These are passed, to the procedure determining the delay 510. The delay is determined with the help of what is called the fundamental diagram model 507 and additional information from roadways 501, both of which are described in detail in the following.

Some embodiments are based on the recognition that the density of vehicles along a road segment is equal to the flow multiplied by the time taken to traverse the road segment divided by the length of the road segment. Since the delay corresponding to a road segment is defined as the time taken to traverse the road segment, the relationship between delay function and vehicle flow on a particular road segment i is given by $$\rho_i = \frac{x_i d_i(x_i)}{\ell_i},$$

where $\rho_i$ and $\ell_{i,i}$ are the density and length of that particular road segment. In the practice of traffic management, density and flow are related to each other via what is called Greenshield's model or the fundamental diagram. According to the empirically determined fundamental diagram, like the length of a particular road segment, the relationship between density and flow is physically fixed for a particular road segment.

FIG. 5B shows a plot of an example of the fundamental diagram used by some embodiments. According to the fundamental diagram, one value of traffic flow can correspond to two different values of density. It is therefore advantageous to know if the particular value of flow, that has been estimated or measured by the traffic flow observer, corresponds to a traffic density before or past the point of maximum flow 535. This can be done by measuring traffic density. Even a crude method would suffice since we only need to know whether the density is above or below the critical point 535. Depending on this, the value of delay function is different. If the density is below this critical point 535, then the relationship between flow and density can be inverted according to $$\rho_i = f_-(x_i).$$

If it is after, then the relationship can be given by $$\rho_i = f_+(x_i).$$

These functions are determined from the fundamental diagram. As an example, the fundamental diagram is often modeled as a quadratic relationship $$x_i = v_i^m \rho_i (1 - \rho_i / \rho_i^j)$$

Where $v_i^m$ and $\rho_i^j$ are parameters unique to the road segment. This function reaches a maximum at $$\rho_i = \frac{\rho_i^j}{2}.$$

If $$\rho_i < \frac{\rho_i^j}{2},$$

then the quadratic equation gives the relationship $$\rho_i = f_-(x_i) = \rho_i^j/2 - \sqrt{\frac{(\rho_i^j)^2}{4} - \frac{\rho_i^j}{v_i^m} x_i}.$$

If $$\rho > \frac{\rho_i^j}{2},$$

then the quadratic equation gives the relationship $$\rho_i = f_+(x_i) = \rho_i^j/2 + \sqrt{\frac{(\rho_i^j)^2}{4} - \frac{\rho_i^j}{v_i^m} x_i}.$$

The delay function is therefore given by the arithmetic relationship $$d_i(x_i) = \frac{\ell_i f_\pm(x_i)}{x_i}$$

Where the value of $\eta_\pm$ is $\eta_-$ if $$\rho_i < \frac{\rho_i^j}{2}$$

or $f_+$ if $$\rho_i > \frac{\rho_i^j}{2}.$$

Some embodiments are based on realization that, since $x_i = \rho_i v_i$, and average velocities do not increase with increasing density, the point of maximum flow corresponds to a boundary average velocity corresponding to the critical point 535, which is referred herein as $v_i^*$. To determine whether the density function corresponds to $\eta_+$ or $\eta_-$, it is only necessary to determine the average velocity of traffic and determine if it is less than or greater than the boundary average velocity $v_i^*$. Therefore, the estimate of density can be done by measuring the average vehicle velocity of vehicles along a road segment. If the velocity is less than $v_i^*$, then $\eta_\pm = \eta_-$; if greater than, then $\eta_\pm = \eta_+$.

Figure 5C:
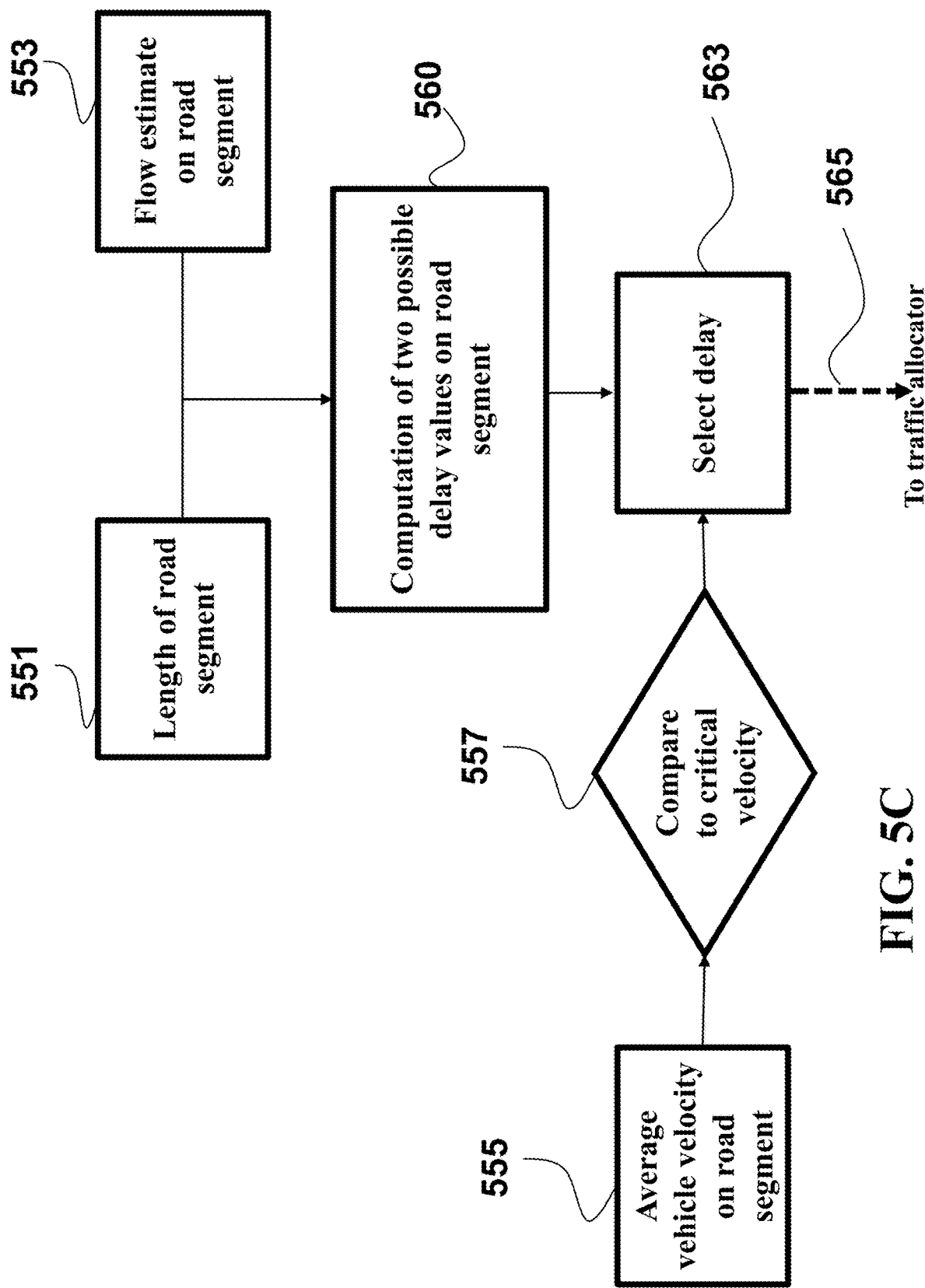
FIG. 5C shows a block diagram of a method for determining a delay on a segment of a road according to one embodiment.

FIG. 5C shows a block diagram of a method for determining a delay on a segment of a road according to one embodiment. The embodiment receives the length of the road segment $\ell_i$ and the flow estimate $x_i$ 553 on the road segment to compute 560 both $\eta_-$ or $\eta_+$ values of delays. The embodiment compares 557 an average velocity 555 of the vehicles on the segment of the road with a boundary average velocity to produce a comparison result and selects 563 a value of the delay 565 from the two values of the delay based on the comparison result.

Exemplar Cooperative Vehicle

Figure 6:
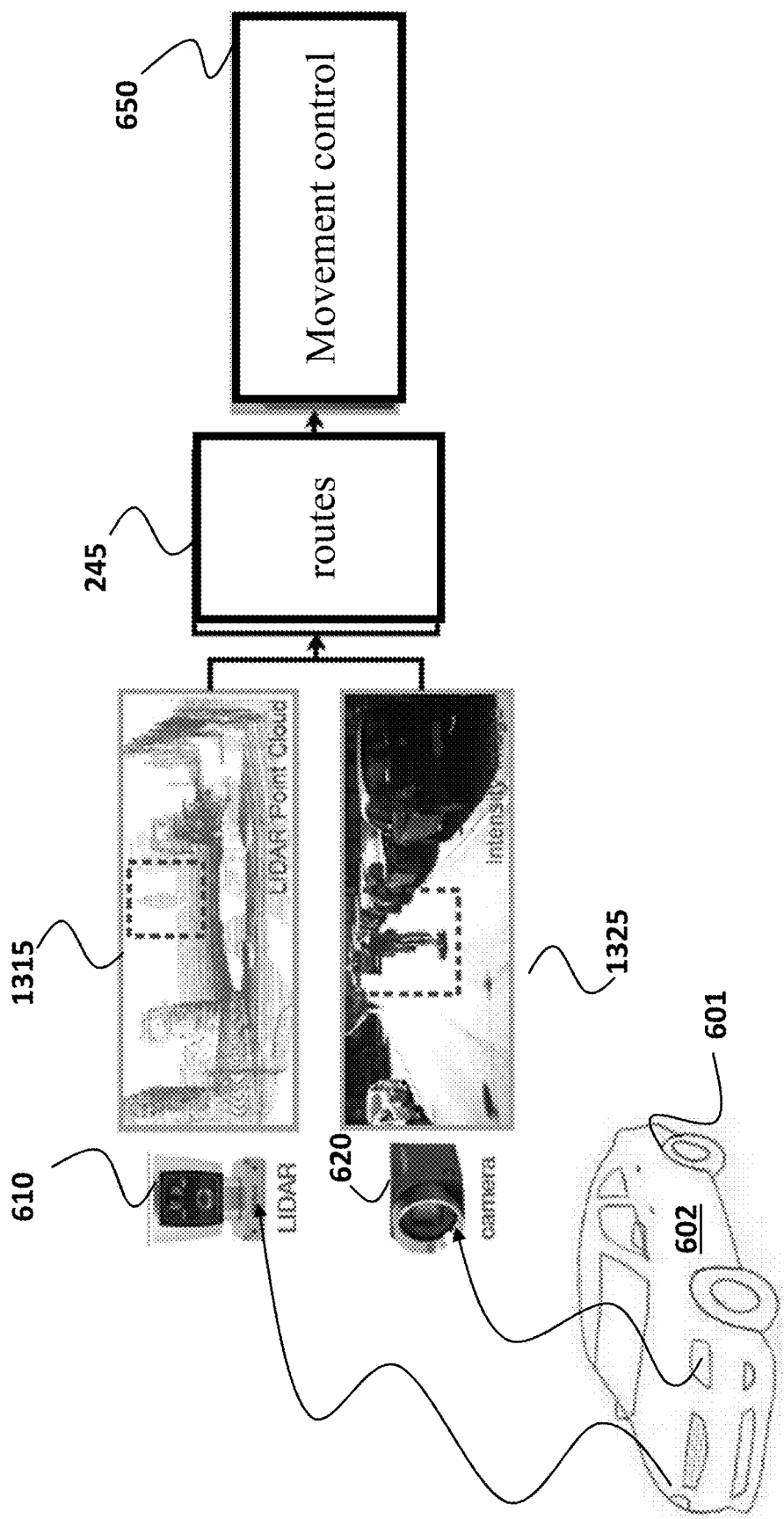
FIG. 6 shows a schematic of a cooperative vehicle according to one embodiment.

FIG. 6 shows a schematic of a cooperative vehicle 601 according to one embodiment. The vehicle 601 including a processor 602 configured for controlling 650 the movement of the vehicle. The vehicle also includes at least one sensor, such as a LIDAR 610 and/or a camera 620. The sensor 610 and/or 620 is operatively connected to the processor 602 and is configured for sensing information indicative of the state of the environment. Using this information, the processor 602, upon receiving the routes 245 from the system 100, determines control inputs to the actuators of moving vehicle. For example, if the vehicle is an autonomous vehicle, the control commands could be acceleration and torque values. Additionally, or alternatively, when the vehicle is a manually operated, the control commands can update a navigation system showing directions to a driver.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A traffic control system for controlling a traffic of cooperative and uncooperative vehicles in a network of roads, the traffic control system comprising:
 a receiver configured to receive information indicative of a current state of a flow of the traffic in the network of roads, an inflow rate of the traffic into the network of roads, an outflow rate of the traffic out of the network of roads, and current locations and target locations of the cooperative vehicles;
 a processor coupled with stored instructions implementing components of the traffic control system, including:
  a traffic observer configured to determine delays on each segment of the roads of the network based on the current state of the flow of the traffic;
  a traffic allocator configured to
   determine flows of the cooperative and uncooperative vehicles that satisfy a Nash equilibrium using the inflow rate of the traffic, the outflow rate of the traffic, and the delays on the roads, the cooperative vehicles having a common objective and the uncooperative vehicles having individual objectives, and
   determine, for the cooperative vehicles, costs of segments of the roads that correspond to the Nash equilibrium;
  a traffic router configured to determine routes for the cooperative vehicles based on the current locations and target locations of the cooperative vehicles, and the costs of the segments of the roads in the network determined for the cooperative vehicles; and
 a transmitter configured to transmit the routes to corresponding cooperative vehicles.

2. The traffic control system of claim 1, wherein the traffic observer updates the delays on the roads in response to a change in the current state of a flow of the traffic, wherein the traffic allocator updates the costs of the segments of the roads in the network determined for the cooperative vehicles in response to the updates of the delays on the roads, wherein the traffic router updates the routes in response to the updates of the costs, and wherein the transmitter transmits the updated routes to the corresponding vehicles.

3. The traffic control system of claim 1, wherein the cooperative vehicles belong to different groups having different common objectives, and wherein the traffic allocator finds the Nash equilibrium using different common objectives of the cooperative vehicles of different groups.

4. The traffic control system of claim 1, further comprising:
 a set of sensors configured to sense vehicles passing junctions of the segments of the roads, wherein the processor is configured to determine the current state of the flow of the traffic, the inflow rate of the traffic, the outflow rate of the traffic using data sensed by the sensors and received by the receiver.

5. The traffic control system of claim 1, wherein the receiver is operatively connected to navigators of the cooperative vehicles to receive the current locations and the target locations of the cooperative vehicles.

6. The traffic control system of claim 1, wherein the delay on the road is defined by a nonlinear function.

7. The traffic control system of claim 1, wherein the traffic observer, to determine the delay on a segment of a road is configured to determine using a fundamental diagram two values of the delay corresponding to a flow of the vehicles on the segment of the road;

compare an average velocity of the vehicles on the segment of the road with a boundary average velocity to produce a comparison result;

select a value of the delay from the two values of the delay based on the comparison result.

8. The traffic control system of claim 1, wherein the traffic allocator determines the flows of the cooperative and uncooperative vehicles that satisfy the Nash equilibrium iteratively until a termination condition is reached, wherein for a current iteration the traffic allocator is configured to update the flow of the cooperative vehicles for fixed latest value of the flow of the uncooperative vehicles; and update the flow of the uncooperative vehicles for fixed latest value of the flow of the cooperative vehicles.

9. The traffic control system of claim 8, wherein the processor, in response to reaching the termination condition, determines the cost by differentiating a term under a summand of the common objective for the determined flows of cooperative and uncooperative vehicles.

10. The traffic control system of claim 1, wherein the traffic router, to determine the routes for the cooperative vehicles is configured to solve an optimization problem corresponding to the minimum cost path in the network of roads.

11. The traffic control system of claim 10, wherein the optimization problem is solved using a variation of Dijkstra's algorithm.

12. A traffic control method for controlling a traffic of cooperative and uncooperative vehicles in a network of roads, wherein the method uses a processor coupled with stored instructions implementing the method, wherein the instructions, when executed by the processor carry out steps of the method, comprising:

receiving information indicative of a current state of a flow of the traffic in the network of roads, an inflow rate of the traffic into the network of roads, an outflow rate of the traffic out of the network of roads, and current locations and target locations of the cooperative vehicles;

determining delays on each segment of the roads of the network based on the current state of the flow of the traffic;

determining flows of the cooperative and uncooperative vehicles that satisfy a Nash equilibrium using the inflow rate of the traffic, the outflow rate of the traffic, and the delays on the roads, the cooperative vehicles having a common objective and the uncooperative vehicles having individual objectives;

determining, for the cooperative vehicles, costs of segments of the roads that correspond to the Nash equilibrium;

determining routes for the cooperative vehicles based on the current locations and target locations of the cooperative vehicles, and the costs of the segments of the roads in the network determined for the cooperative vehicles; and transmitting the routes to corresponding cooperative vehicles.

13. The traffic control method of claim 12, further comprising:

updating the delays on the roads in response to a change in the current state of a flow of the traffic;

updating the costs of the segments of the roads in the network determined for the cooperative vehicles in response to the updates of the delays on the roads;

updating the routes in response to the updates of the costs;

transmitting the updated routes to the corresponding vehicles.

14. The traffic control system of claim 12, wherein the cooperative vehicles belong to different groups having different common objectives, and wherein the method finds the Nash equilibrium using different common objectives of the cooperative vehicles of different groups.

15. A non-transitory computer readable storage medium embodied thereon a program executable by a processor for performing a method, the method comprising:

receiving information indicative of a current state of a flow of the traffic in the network of roads, an inflow rate of the traffic into the network of roads, an outflow rate of the traffic out of the network of roads, and current locations and target locations of the cooperative vehicles;

determining delays on each segment of the roads of the network based on the current state of the flow of the traffic;

determining flows of the cooperative and uncooperative vehicles that satisfy a Nash equilibrium using the inflow rate of the traffic, the outflow rate of the traffic, and the delays on the roads, the cooperative vehicles having a common objective and the uncooperative vehicles having individual objectives;

determining, for the cooperative vehicles, costs of segments of the roads that correspond to the Nash equilibrium;

determining routes for the cooperative vehicles based on the current locations and target locations of the cooperative vehicles, and the costs of the segments of the roads in the network determined for the cooperative vehicles; and transmitting the routes to corresponding cooperative vehicles.

* * * * *